(12) United States Patent
Davis et al.

(10) Patent No.: US 11,150,367 B2
(45) Date of Patent: Oct. 19, 2021

(54) FRACTURE MAPPING WITH AUTOMATED TEMPORAL ANALYSIS

(71) Applicant: Halliburton Energy Services, Inc., Houtons, TX (US)

(72) Inventors: Eric J. Davis, El Cerrito, CA (US); Scott D. Marsic, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 713 days.

(21) Appl. No.: 15/763,204

(22) PCT Filed: Nov. 23, 2015

(86) PCT No.: PCT/US2015/062086
§ 371 (c)(1),
(2) Date: Mar. 26, 2018

(87) PCT Pub. No.: WO2017/091191
PCT Pub. Date: Jun. 1, 2017

(65) Prior Publication Data
US 2018/0267185 A1  Sep. 20, 2018

(51) Int. Cl.
*G01V 1/30* (2006.01)
*G01V 1/24* (2006.01)
(Continued)

(52) U.S. Cl.
CPC ............... *G01V 1/24* (2013.01); *G01V 1/301* (2013.01); *G01V 1/308* (2013.01); *G01V 1/42* (2013.01);
(Continued)

(58) Field of Classification Search
CPC ......... G01V 1/301; G01V 1/308; G01V 1/42; G01V 1/40; G01V 11/00;
(Continued)

(56) References Cited

U.S. PATENT DOCUMENTS 8,515,720 B2* 8/2013 Koutsabeloulis .... G01V 99/005
703/10
9,612,359 B2* 4/2017 Holland ................. G01V 11/00
(Continued)

FOREIGN PATENT DOCUMENTS

WO  2017091191 A1  6/2017

*Primary Examiner* — Krystine E Breier
(74) *Attorney, Agent, or Firm* — John W. Wustenberg; Parker Justiss, P.C.

(57) ABSTRACT

An illustrative fracture mapping system includes: a data acquisition unit collecting measurements deformation measurements during a fluid injection phase of a hydraulic fracturing operation; and a processing system implementing a formation mapping method. The formation mapping method includes: obtaining an initial fracture map having a location and geometry for one or more fractures activated during the fluid injection phase, the fracture map corresponding to a given time during the hydraulic fracturing operation; deriving from the initial fracture map a time series of fracture maps for times preceding the given time; and storing the time series on a nonvolatile information storage medium. The deriving may be performed in an iterative fashion to obtain each fracture map in the time series from a subsequent fracture map.

20 Claims, 3 Drawing Sheets

(51) Int. Cl.
  *G01V 11/00*   (2006.01)
  *G01V 1/42*   (2006.01)
  *G01V 1/40*   (2006.01)

(52) U.S. Cl.
  CPC ............... *G01V 11/00* (2013.01); *G01V 1/40* (2013.01); *G01V 2210/1234* (2013.01); *G01V 2210/612* (2013.01); *G01V 2210/6169* (2013.01); *G01V 2210/646* (2013.01)

(58) Field of Classification Search
  CPC ..... G01V 2210/1234; G01V 2210/612; G01V 2210/6169; G01V 2210/646
  See application file for complete search history.

(56) References Cited

U.S. PATENT DOCUMENTS

| | | | |
|---|---|---|---|
| 10,416,328 B2 * | 9/2019 | Walters | G01V 1/42 |
| 2006/0081412 A1 | 4/2006 | Wright et al. | |
| 2007/0272407 A1 * | 11/2007 | Lehman | E21B 43/26 166/250.1 |
| 2011/0188347 A1 | 8/2011 | Thiercelin et al. | |
| 2012/0318500 A1 | 12/2012 | Urbancic et al. | |
| 2015/0240631 A1 | 8/2015 | Bittar et al. | |
| 2018/0245442 A1 * | 8/2018 | Ma | E21B 43/26 |
| 2018/0355707 A1 * | 12/2018 | Rodriguez Herrera | G01V 1/50 |

\* cited by examiner

FIG. 1
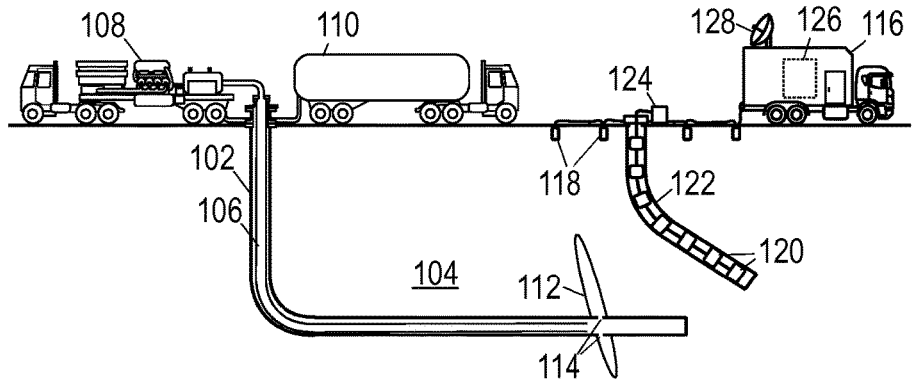
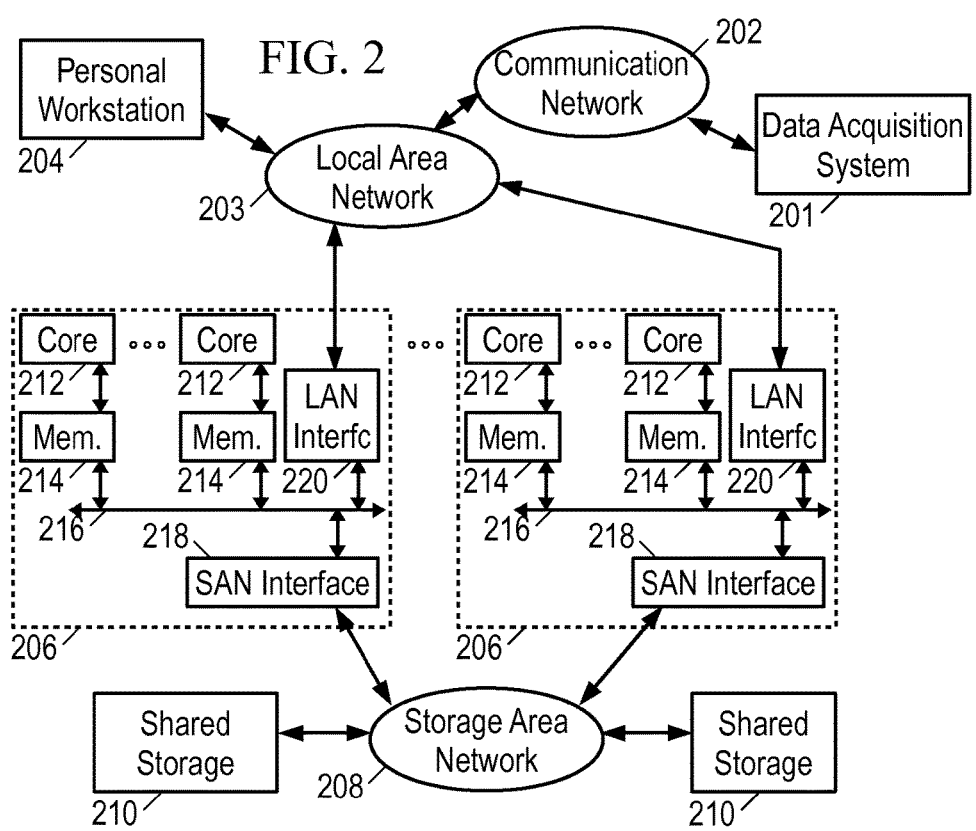

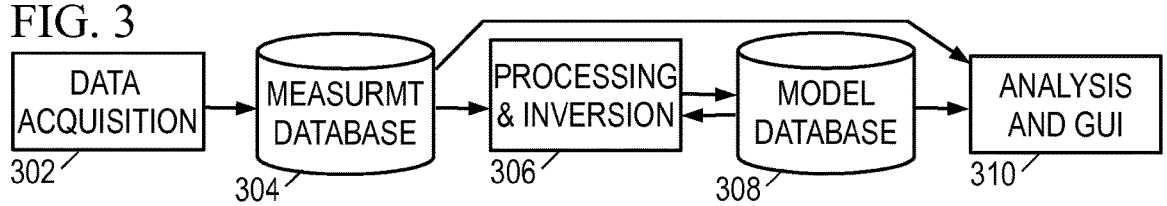
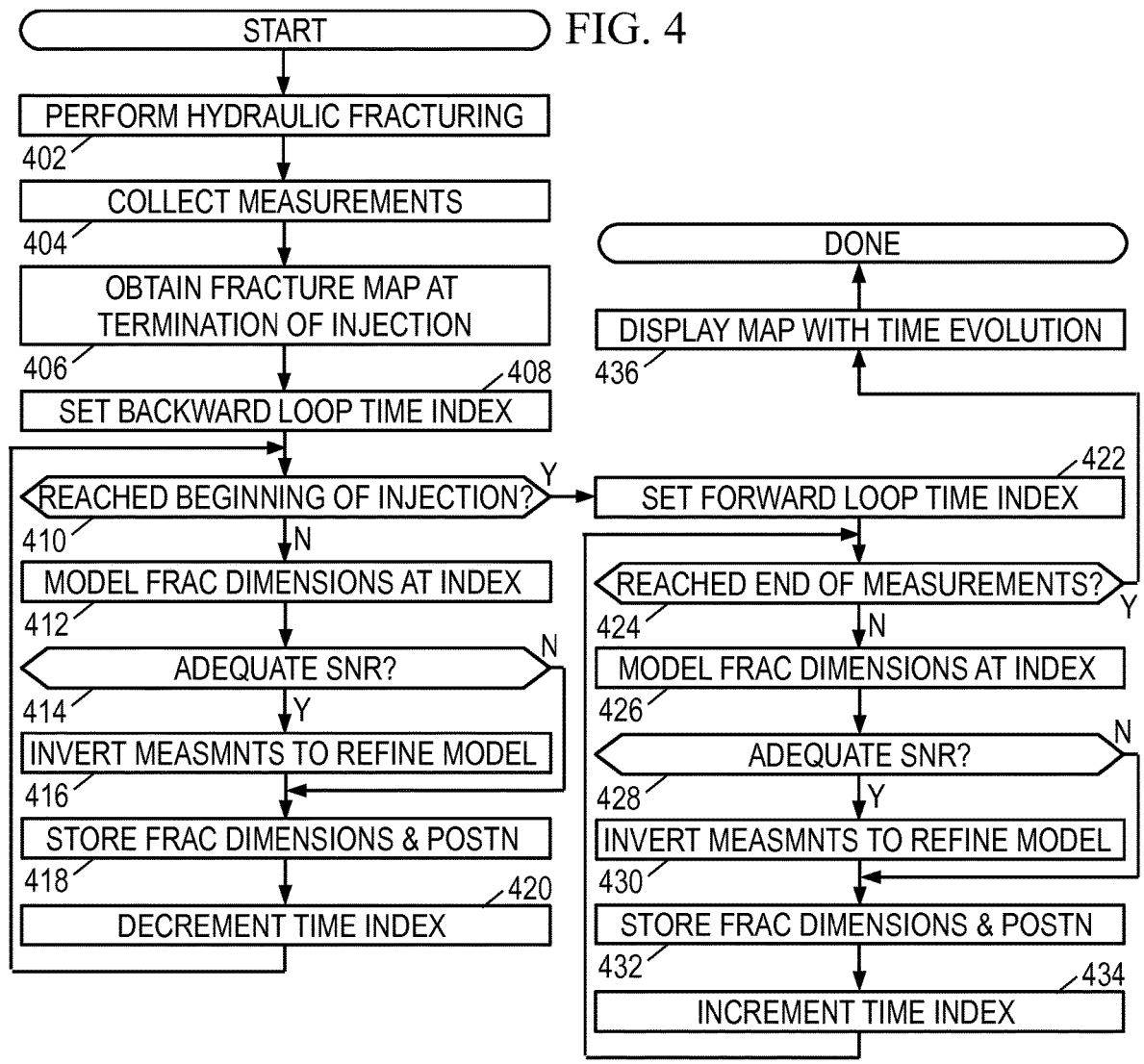

FRACTURE MAPPING WITH AUTOMATED TEMPORAL ANALYSIS

CROSS-REFERENCE TO RELATED APPLICATION

This application is the National Stage of, and therefore claims the benefit of, International Application No. PCT/US2015/062086 filed on Nov. 23, 2015, entitled "FRACTURE MAPPING WITH AUTOMATED TEMPORAL ANALYSIS," which was published in English under International Publication Number WO 2017/091191 on Jun. 1, 2017. The above application is commonly assigned with this National Stage application and is incorporated herein by reference in its entirety.

BACKGROUND

Unconventional reservoirs often have a low-permeability rock matrix that impedes fluid flows, making it difficult to extract hydrocarbons (or other fluids of interest) at commercially-feasible rates and volumes. Fortunately, the effective permeability of the formation can be increased by hydraulic fracturing. When the rock matrix is exposed to a high-pressure, high-volume flow of a relatively incompressible fluid, the low permeability causes sharp gradients in the formation's stress field, forcing integrity failures at the relatively weakest points of the rock matrix. Such failures often occur as sudden "cracking" or fracturing of the matrix that momentarily reduces the stress gradient until it can be rebuilt by the intruding fluid flow. As the high-pressure flow continues, the fractures propagate outward from the fluid injection point.

Oilfield services providers have developed a number of techniques for mapping and monitoring the development of hydraulic fractures, including the use of tiltmeter arrays to measure fracture-induced deformations from hundreds or thousands of feet away. The tiltmeter array may be distributed at the Earth's surface or in one or more nearby observation wells. While the use of such measurements has proven to be an effective and affordable monitoring technique, they generally require manual interpretation by a human analyst, adding latency and cost to the process.

BRIEF DESCRIPTION OF THE DRAWINGS

Accordingly, the drawings and the following description disclose hydraulic fracture mapping and monitoring systems and methods having automated temporal analysis to reduce the burden on the human analyst. In the drawings:

FIG. 1 is an environmental view of an illustrative hydraulic fracturing operation.

FIG. 2 is a block diagram of an illustrative hydraulic fracture monitoring system.

FIG. 3 is a block diagram of an illustrative fracture monitoring software architecture.

FIG. 4 is a flow diagram of an illustrative hydraulic fracture monitoring method.

Figure 5:
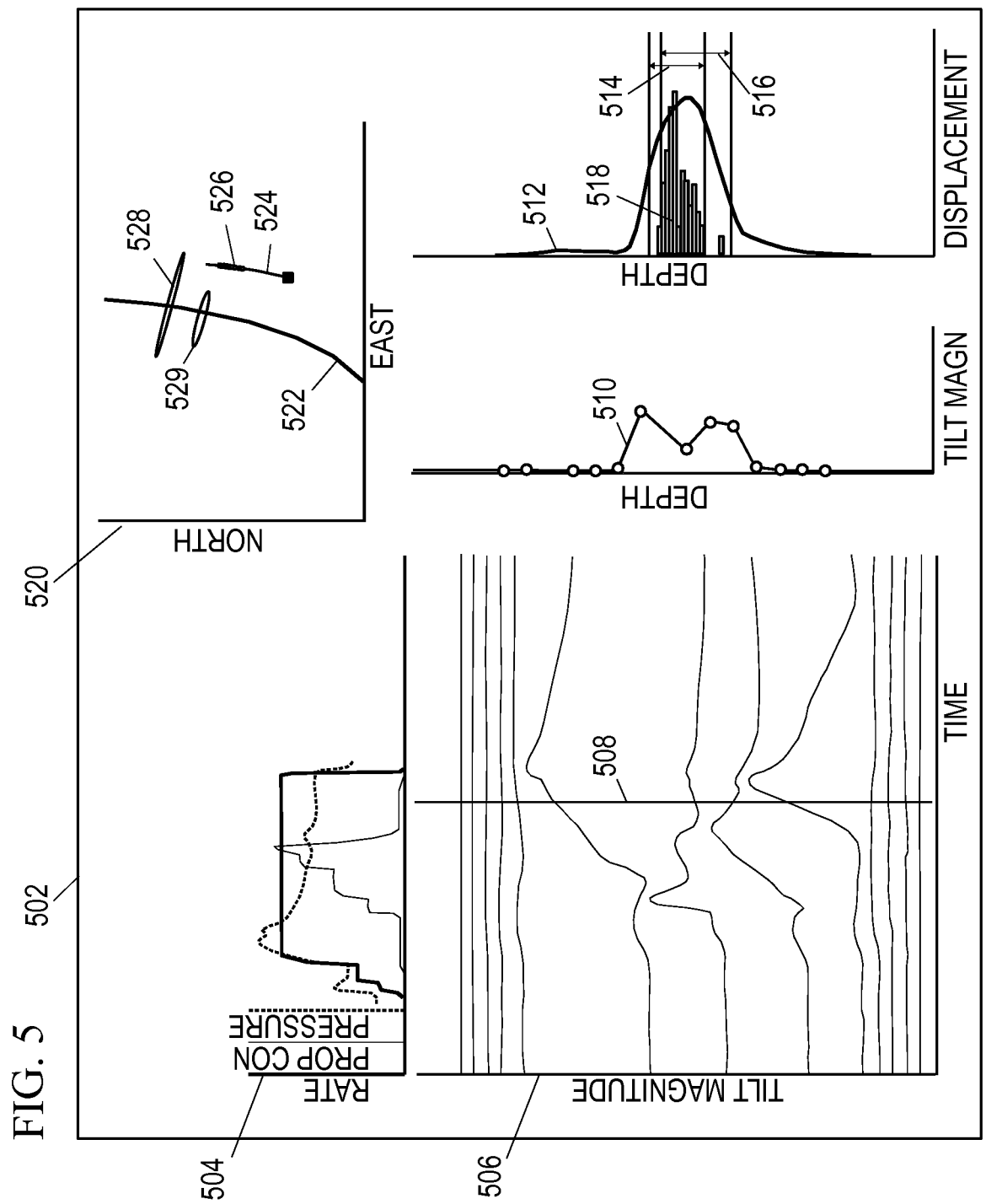
FIG. 5 is a layout of an illustrative hydraulic fracture mapping screen.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

TERMINOLOGY

As used herein, the term "deformation measurements" is used as a generic term to include tilt measurements from a tiltmeter array and displacement measurements from displacement sensors, and other measurements indicative of surface/wellbore deformation (e.g., volumetric strain measurements, compaction measurements), whether acquired at the surface or in a borehole. The term "fracture geometry" is used to refer to a set of fracture parameters that indicates the dimensions and orientation of a fracture, e.g.: length, height, aperture, dip, and strike. The term "fracture map" is used to refer to a display or record of fracture locations and geometries. The term "forward model" is used herein to refer to a method for predicting deformation measurements at specified sensor locations from estimated values for fracture location and geometry parameters.

DETAILED DESCRIPTION

The disclosed hydraulic fracture mapping systems and methods are best understood in context. Accordingly, FIG. 1 shows the environment of an illustrative hydraulic fracturing operation. A wellbore 102 extends from the surface into a subterranean region 104. Typically, the subterranean region 104 includes a reservoir that contains hydrocarbons or other resources such as, e.g., oil. As another example, the subterranean region 104 may include all or part of a rock formation (e.g., shale, coal, sandstone, granite, or others) that contains natural gas. The subterranean region 104 may include naturally fractured rock or natural rock formations that are not fractured to any significant degree. When the subterranean region 104 includes tight gas formations (i.e., natural gas trapped in low permeability rock such as shale), it is typically desirable to create additional fractures in the formation to increase the formation's effective permeability.

Accordingly, FIG. 1 also shows an injection assembly coupled to supply a high-pressure, high-volume fluid flow into the wellbore 102 via a conduit 106. The injection assembly includes one or more pumps 108 and tanks 110 that operate to inject fluid via the conduit 106 into the subterranean region 104, thereby opening existing fractures and creating new fractures 112. The fluid reaches the formation via one or more fluid injection locations 114, which in many cases are perforations in the casing of wellbore 102. Such casing may be cemented to the wall of the wellbore 102, though this is not a requirement. In some implementations, all or a portion of the wellbore 102 may be left open, without casing.

The fracture treatment may employ a single injection of fluid to one or more fluid injection locations 114, or it may employ multiple such injections, optionally with different fluids and entrained solids. Where multiple fluid injection locations 114 are employed, they can be stimulated concurrently or in stages. Moreover, the injection locations 114 need not be located within the same wellbore 102, but may for example be distributed across multiple wells or multiple laterals within a well.

A survey system maps and monitors the hydraulic fractures 112 that are stimulated by the injection assembly. The survey system includes one or more instrument trucks 116 coupled a sensor array 118 located at the surface and/or a downhole sensor array 120 located in one or more monitoring boreholes 122. A surface interface 124 collects measurements from downhole and communicates them to a data acquisition and processing system 126, which is shown as localized to a single instrument truck 116 but may be distributed across multiple instrument trucks 116, interfaces 124, sensors in arrays 118, 120, and interfaces and sensors on the pumps 108, tanks 110, valves, feeders, and tubing of the injection assembly. It may further include remotely coupled offsite computing facilities available via wired or wireless communication links 128 and networks.

The injection assembly can include mobile vehicles, immobile installations, skids, hoses, tubes, fluid tanks, fluid reservoirs, pumps, valves, mixers, or other types of structures and equipment. They supply treatment fluid and other materials (e.g., proppants, stop-loss materials) for the injection treatment. The illustrated pumps 108 are coupled to valves and pump controls for starting, monitoring, stopping, increasing, decreasing or otherwise controlling pumping rates and pressures as well as controls for selecting or otherwise controlling fluids pumped during the injection treatment.

The survey system can include mobile vehicles, immobile installations, or other suitable structures and sensors for measuring temperatures, pressures, flow rates, and other treatment and production parameters. In some embodiments, the survey system may provide measurements or signals as feedback for monitoring and adaptively controlling the injection treatment applied by the injection assembly. The injection assembly may inject fluid into the formation above, at, or below a fracture initiation pressure; above, at, or below a fracture closure pressure; or at another fluid pressure.

Though downhole sensor array 120 is shown as being positioned in a monitoring well, it may also or alternatively be located in the injection well 102. Sensor arrays 118, 120 measure tilt, displacement, or alternative measurements of deformation. In some embodiments, the sensor arrays further detect seismic energy from the microseismic events that occur as fractures are formed and propagated. As discussed further below, such information is indicative of the fracture locations and dimensions, which information may be used to determine when the fracturing operations should be terminated and how to carry out subsequent operations to achieve the desired results.

In certain embodiments, the data acquisition and processing system 126 may provide real-time processing for monitoring injection treatments applied to the subterranean region 104 through the wellbore 102. The processing system 126 may be communicably linked to a remote computing facility that can calculate, select, or optimize treatment parameters for initiating, opening, and propagating fractures of the desired extent. The processing system 126 may receive, generate or modify an injection treatment plan (e.g., a pumping schedule) that specifies properties of an injection treatment to be applied to the subterranean region 104. Based on modeled behavior results, the processing system 126 shown in FIG. 1 may provide feedback for controlling operation of the injection assembly.

The hydraulic fracturing operation typically consists of an injection phase, where fluids are being pumped downhole to open and expand the fractures, and a closure phase, where the pumping has been halted and the volume of fluid trapped in the fractures decreases through leak-off or flow-back. Some fracturing operations may have multiple injection and closure phases. Whether newly induced or pre-existing, fractures are said to be "activated" when they accept fluid flow induced by the injection process.

FIG. 2 shows an illustrative data acquisition and processing system 126 in which a data acquisition system 201 represents the instrument trucks 116 and other sources of data regarding the well and surrounding formations. A communications network 202 (such as, e.g., the internet or other communications link for transferring digital data) couples the data acquisition system 201 to a local area network (LAN) 203 to transfer the data to a personal workstation 204. The data can include the injection treatment plan, injection treatment measurements, fluid data, geological data, fracture model information, microseismic event information, deformation measurements, and other types of data. Workstation 204 may take the form of a desktop computer having a user interface (e.g., keyboard, mouse, and display) that enables the user to interact with the other elements of the computing subsystem, e.g., by entering commands and viewing responses. In this fashion, the user is able to retrieve the measurement data and make it available for estimating fracture locations and geometry.

Workstation 204 may lack sufficient internal resources to perform such processing in a timely fashion. The LAN 203 further couples the workstation 204 to one or more multi-processor computers 206, which are in turn coupled via a storage area network (SAN) 208 to one or more shared storage units 210. LAN 203 provides high-speed communication between multi-processor computers 206 and with personal workstation 204. The LAN 203 may take the form of an Ethernet network.

Multi-processor computer(s) 206 provide parallel processing capability to enable suitably prompt inversion of the microseismic and deformation data. Each computer 206 includes multiple processors 212, distributed memory 214, an internal bus 216, a SAN interface 218, and a LAN interface 220. Each processor 212 operates on allocated tasks to solve a portion of the overall problem and contribute to at least a portion of the overall results. Associated with each processor 212 is a distributed memory module 214 that stores application software and a working data set for the processor's use. Internal bus 216 provides inter-processor communication and communication to the SAN or LAN networks via the corresponding interfaces 218, 220. Communication between processors in different computers 206 can be provided by LAN 203 or via a mailbox mechanism on storage devices 210.

SAN 208 provides low-latency access to shared storage devices 210. The SAN 208 may take the form of, e.g., a Fibrechannel or Infiniband network. Shared storage units 210 may be large, stand-alone information storage units that employ magnetic disk media for nonvolatile data storage. Other suitable forms of nontransitory information storage media can also be employed. To improve data access speed and reliability, the shared storage units 210 may be configured as a redundant disk array ("RAID").

It is the software that configures the various parts of the processing system 126 to coordinate and collectively operate as a hydraulic fracture modeling system. One or more commercially available software packages and libraries may be installed in the processing system to provide the functionality for solving linear systems. User-authored programs, functions, scripts, workflows, or other programming mechanisms may be employed to customize the operation of the software and automate certain operations such as those outlined below for time-dependent fracture mapping. Examples of commercially available software that support the use of such programming include C, C++, C++ AMP, D, Erlang, Fortran, and Python. The processing system 126 can be preprogrammed or can be programmed (and reprogrammed) by loading a program from another source (e.g., from a CD-ROM, from another computer device through a data network, or in another manner). Nevertheless, the implementation of the following methods is not limited to any specific software language or execution environment.

The software operating on processing system 126 may be structured as indicated by the software architecture shown in FIG. 3. A data acquisition module 302 stores various types of data in a measurement database 304 such as the injection treatment plan, measurements of injected fluid volumes, pressures, flow rates, densities, viscosity, entrained solids, thermodynamic properties, fluid chemistry, microseismic event times and locations, tiltmeter array or deformation measurements, and other types of data. The measurement database may further include geological data, wellbore locations, injection locations, and other attributes of the subterranean region. In some cases, the geological data includes information on the layering, lithology, porosity, permeability, fluid content, stress profile (e.g., stress anisotropy, maximum and minimum horizontal stresses), pressure profile, spatial extent, and other attributes of the subterranean zone. The geological data can include information collected from well logs, core samples, outcroppings, microseismic imaging, or other data sources.

The fracture mapping and temporal processing modules 306 employ the information from the measurement database 304 to locate and model the propagation of activated fractures, storing the fracture properties in model database 308, which may reside on a nontransient information storage medium such as an optical, magnetic, or solid state drive. The fracture properties may include locations, dimensions, and orientations. A visualization and analysis module 310 generates visual representations of the fracture planes and measurements for an operator, generally in an interactive form that enables the operator to enhance portions of the model and derive analytical results therefrom. The visual representation may depict time-dependent fracture maps and/or integrated values such as fracture volumes.

FIG. 4 presents an illustrative method for mapping time dependent fracture geometries, which may be implemented in large part by the previously described data acquisition and processing system 126. Though the operations of the method are shown and described as being sequential, in practice many of the operations are expected to occur concurrently and with potentially different ordering.

The method begins in block 402 with a crew performing a hydraulic fracturing operation. Such operations normally occur in accordance with a predetermined pumping schedule that specifies a sequence of fluid compositions along with volumes, pumping rates, and injection pressures, though various parameters can be and are expected to be varied as circumstances require.

In block 404, data acquisition and processing system 126 collects measurements of the treatment parameters and deformation. In at least some embodiments, the deformation measurements are signals from an array of tiltmeters on the surface and/or in one or more downhole wellbores. Other suitable measurements may be obtained using displacement sensors.

In block 406, the processing system 126 obtains a map of the fracture geometry at the termination of the fluid injection phase. In other words, at the time when the injection assembly has finished pumping fluid downhole and before any significant leak-off or flow-back has occurred, the induced fractures are at their maximum volume. The deformation sensors are accordingly detecting the maximum or close to maximum tilt or displacement, thereby maximizing signal-to-noise ratio for the inversion process. Although block 406 indicates a map at the termination of injection, the map may also be obtained at a time prior to termination of injection if the results up to that time period are desired.

In some embodiments, the processing system 126 performs an unguided inversion of the deformation measurements to obtain the location and geometry of the fractures. As used herein, the term "inversion" is a technique in which a forward model is used to predict the deformation measurements that would be made for given model parameters, i.e., the location and geometry of the induced fractures. The inversion technique iteratively refines the parameter values until the predicted measurements match the actual measurements. Suitable approaches for such inversion are disclosed in the literature including, e.g., Wright et al., "Downhole Tiltmeter Fracture Mapping", SPE 46194, 1998; Wright et al., "Real-time Fracture Mapping from the 'Live' Treatment Well", SPE 71648, 2001; and Du et al., "Mapping Reservoir Volume Changes During Cyclic Steam Stimulation Using Tiltmeter-Based Surface-Deformation Measurements", SPE 97848, 2005.

The location of each fracture may be expressed as coordinates of the fracture's center, or another representative point such as a corner. The geometry may be expressed as dimensions and orientation of the fracture. The dimensions may be expressed as a length (e.g., a horizontal extent of the fracture), a height (e.g., a vertical extent of the fracture), and width (e.g., a maximum gap size of the fracture). As the fracture is approximately planar, the orientation may be expressed using spherical coordinates of a unit normal vector (e.g., azimuth and elevation, sometimes called "strike" and "dip"). In many cases, the fractures are presumed to have a simple geometrical shape, e.g., ellipsoidal or parallelepided, to simplify the inversion process.

However, unguided inversion is often not feasible due to the underdetermined nature of the problem. Accordingly, at least some embodiments of the processing system 126 perform a guided inversion of the deformation measurements based on constraints or manual inputs provided by an analyst, e.g., a number of fractures and their approximate locations. In still other embodiments, the fracture locations and geometries are obtained from an external source, e.g., other inversion software or methods.

In block 408, the processing system initializes a time index in preparation for the backwards evolution loop (blocks 410-420) to obtain a time series of fracture maps from the initial fracture map. The time index is set to represent the time just prior to termination of the fluid injection. The backwards evolution loop begins in block 410 with a test to determine if the time index represents the time at initiation of the fluid injection phase.

If not, the processing system 126 in block 412 analytically models the geometry of the fractures at the time index. The number and locations of the fractures remain unchanged in this block. The model combines the (backward) time difference with the injection parameters (including flow rate) to obtain a change in fracture volume. The change in fracture volume is combined with the fracture geometry at the later time step (the time subsequent to that represented by the current value of the time index) to estimate the dimensions of the fractures at the preceding time step (the time represented by the current value of the time index) to obtain a predicted fracture map. The analytic model may account for stress fields, pressure distribution, thermodynamic properties, leak-off, and other formation attributed when estimating the dimensions for the preceding time step. Processing system 126 may then apply a forward model to the predicted fracture map to obtain predicted deformation measurements.

In block 414, the processing system 126 compares the deformation measurements at the current time index to an estimated noise value. The noise value can be determined from instrument data during a time when no fracture growth is taking place, or can be determined from the difference between the measured deformation and the model at some time, such as the time in block 406, or a combination of these methods. If the deformation signal is deemed sufficiently large compared to the noise, the measurement signal is sufficiently sensitive to inaccuracies in the geometry that the inaccuracies can be refined through further inversion processing. The processing system 126 then performs such further inversion processing in block 416 to obtain refined model parameter values, before proceeding to block 418. The number and location of fractures may be permitted to change in the refined fracture map. Otherwise the processing system 126 proceeds directly from block 414 to 418.

In block 418, the processing system 126 stores the model parameters (fracture locations, dimensions, and orientations) for the current time index on a nontransient information storage medium (e.g., in model database 308). In block 420, the time index is decremented and blocks 410-420 are repeated until the time index reaches the beginning of the fluid injection process.

In block 422, the processing system 126 initializes a time index in preparation for the optional forward evolution loop (blocks 424-434) to extend the time series of fracture maps, setting it to represent the time just after the termination of the fluid injection phase. In many cases, the forward evolution loop can be omitted, e.g., if the time of the fracture map used in block 406 was not the actual end of pumping, or if the monitoring instruments were shut down or removed immediately following the end of pumping. The optional forward evolution loop begins in block 424 with a test to determine if the time index represents the last time for which deformation measurements are available.

If not, the processing system 126 in block 426 analytically models the geometry of the fractures at the time index. Again, the number and locations of fractures remain unchanged in this block. The model combines the (forward) time difference with the other attributes (flow-back measurements, estimated formation leak-off rate) to obtain a change in fracture volume. The change in fracture volume is combined with the fracture geometry at the previous time step to predict the dimensions and orientations of the fractures at the current time step. The analytic model may account for stress fields, pressure distribution, thermodynamic properties, permeability, and other formation attributes when predicting the dimensions for the current time step. Processing system 126 may then apply a forward model to the predicted fracture geometry to obtain predicted deformation measurements.

In block 428, the processing system 126 compares the deformation measurements to the estimated instrument noise to determine a signal to noise ratio. When the signal to noise ratio exceeds a predetermined threshold, the measurement signal is sufficiently sensitive to inaccuracies in the geometry that the inaccuracies can be refined through further inversion processing. The processing system 126 then performs such further inversion processing in block 430 to obtain refined model parameter values, before proceeding to block 432. Otherwise the processing system 126 proceeds directly from block 428 to 432.

In block 432, the processing system 126 stores the model parameters (fracture locations, dimensions, and orientations) for the current time index on a nontransient information storage medium (e.g., in model database 308). In block 434, the time index is incremented and blocks 424-434 are repeated until the time index reaches the end of the deformation measurement log.

Once both the forward and backward evolution loops have been completed, processing system 126 displays a map of the time-dependent fracture geometry, e.g., as a movie, from initiation of the injection treatment through the termination of the injection treatment and onward through the closure phase to the end of the deformation measurement log.

FIG. 5 shows an illustrative display 502 of the time-dependent fracture map. In the upper-left corner is a treatment parameter graph 504, showing various treatment parameters such as injection fluid flow rate (heavy line), proppant concentration (thin line), and injection pressure (broken line), as a function of time. Immediately below this graph is a tilt measurement graph 506, showing each of the tilt measurements from the tiltmeter array in an offset format that enables the sensor measurements to be compared side by side. A cursor 508 indicates a "current" time being used by the other elements of the illustrative display 502. As the cursor 508 is manually positioned or automatically scrolled along the time axis, curves 510, 512, and fracture geometries 514, 516, 528, 529, are automatically adjusted or animated to correspond to the cursor position.

To the right of the tilt measurement graph 506 is a graph showing a tilt-versus-depth curve 510 at the time corresponding to cursor 508. To the right of tilt-versus-depth curve is a graph showing a displacement-versus-depth curve 512. (Displacement is derivable by integrating the tiltmeter array measurements over the vertical distance spanned by the instruments.) Also shown here are the height dimensions 514, 516 for two different fractures, and a histogram of microseismic event activity 518. Lastly, a fracture map 520 shows an overhead view of the injection wellbore 522, a monitoring wellbore 524, tiltmeter array sensor positions 526, and ellipsoids 528, 529, representing the geometry of two induced fractures.

As the cursor 508 moves to different positions along the time axis, curves 510, 512, 514, 516, 528, and 529 are updated to indicate the measurements and geometries for that time. This display enables an analyst to observe the evolution of the fracture map as it relates to the various treatment parameters and deformation measurements, thereby providing an enhanced understanding of the fracturing operation results.

The foregoing approach of performing a full inversion, with optional guidance from an expert analyst, at the end of the injection phase, enables the inversion to occur at the point where the fracture volume and deformation measurements are maximized, a condition that is expected to minimize inaccuracies from measurement errors and to provide the best possible determination of the number of fractures along with the best possible determination of their locations and geometries. The nearby times offer nearly the same advantages, so there is some flexibility in the choice of time for the full inversion. By treating this fracture map as the starting point of forward and backward inversion loops, the foregoing approach significantly reduces the complexity of determining the fracture maps for other times during the hydraulic fracturing operation and enables the evolution to be derived automatically. The complexity-reducing constraints offered by this approach include knowledge of: (a) pumped volume versus time; (b) initiation location of each fracture; (c) estimated net pressure; (d) number of fractures; (e) final fracture location and geometry; and (f) estimated ratio of fracture volume to pumped volume.

In summary, the embodiments disclosed herein include:

A: A fracture mapping method that comprises: collecting deformation measurements during a fluid injection phase of a hydraulic fracturing operation; obtaining an initial fracture map having a location and geometry for one or more fractures activated during the fluid injection phase, the fracture map corresponding to a given time during the hydraulic fracturing operation; deriving from the initial fracture map a time series of fracture maps for times preceding the given time; and storing the time series on a nonvolatile information storage medium.

B: A fracture mapping system that comprises: a data acquisition unit collecting deformation measurements during a fluid injection phase of a hydraulic fracturing operation; and a processing system implementing a formation mapping method. The formation mapping method includes: obtaining an initial fracture map having a location and geometry for one or more fractures activated during the fluid injection phase, the fracture map corresponding to a given time during the hydraulic fracturing operation; deriving from the initial fracture map a time series of fracture maps for times preceding the given time; and storing the time series on a nonvolatile information storage medium.

Each of the embodiments A and B may further include one or more of the following additional features in any combination: (1) said deriving is performed in an iterative fashion to obtain each fracture map in the time series from a subsequent fracture map. (2) said deriving includes estimating fracture dimension changes based at least in part on flow rate measurements during the fluid injection phase. (3) said deriving includes combining the dimension changes with the subsequent fracture map to get a predicted fracture map. (4) said deriving includes processing the predicted fracture map with a forward model to get predicted measurements. (5) said deriving includes comparing the predicted measurements to said deformation measurements to obtain a prediction error. (6) said deriving includes inverting said deformation measurements using the predicted fracture map to obtain a refined fracture map when the deformation measurements exceed a predetermined noise threshold. (7) said estimating accounts for fluid leak-off. (8) the time series extends to a beginning of the fluid injection phase. (9) the given time corresponds to a termination of the fluid injection phase. (10) said collecting includes collecting deformation measurements during a closure phase of a hydraulic fracturing operation. (11) The method further comprises processing the initial fracture map to extend the time series of fracture maps for times subsequent to the given time. (12) said deformation measurements are tilt measurements from an array of tiltmeters. (13) said obtaining an initial fracture map includes performing an unguided inversion of the deformation measurements.

Numerous variations and modifications will become apparent to those skilled in the art once the above disclosure is fully appreciated. The ensuing claims are intended to cover such variations where applicable.

What is claimed is:

1. A fracture mapping method that comprises:
   collecting deformation measurements during a fluid injection phase of a hydraulic fracturing operation;
   obtaining an initial fracture map having a location and geometry for one or more fractures activated during the fluid injection phase, the fracture map corresponding to a given time during the hydraulic fracturing operation;
   deriving from the initial fracture map a time series of fracture maps for times preceding the given time; and
   storing the time series on a nonvolatile information storage medium.

2. The method of claim 1, wherein said deriving is performed in an iterative fashion to obtain each fracture map in the time series from a subsequent fracture map.

3. The method of claim 2, wherein said deriving includes:
   estimating fracture dimension changes based at least in part on flow rate measurements during the fluid injection phase;
   combining the dimension changes with the subsequent fracture map to get a predicted fracture map;
   processing the predicted fracture map with a forward model to get predicted measurements; and
   comparing the predicted measurements to said deformation measurements to obtain a prediction error.

4. The method of claim 3, wherein said deriving further includes:
   inverting said deformation measurements using the predicted fracture map to obtain a refined fracture map when the deformation measurement signal has a signal to noise ratio above a predetermined threshold.

5. The method of claim 3, wherein said estimating accounts for fluid leak-off.

6. The method of claim 2, wherein the time series extends to a beginning of the fluid injection phase.

7. The method of claim 1, wherein the given time corresponds to a termination of the fluid injection phase.

8. The method of claim 1, wherein said collecting includes collecting deformation measurements during a closure phase of a hydraulic fracturing operation, and wherein the method further comprises processing the initial fracture map to extend the time series of fracture maps for times subsequent to the given time.

9. The method of claim 1, wherein said deformation measurements are tilt measurements from an array of tiltmeters.

10. The method of claim 1, wherein said obtaining includes performing an unguided inversion of the deformation measurements.

11. A fracture mapping system that comprises:
   a data acquisition unit collecting measurements deformation measurements during a fluid injection phase of a hydraulic fracturing operation; and
   a computer implementing a formation mapping method that includes:
      obtaining an initial fracture map having a location and geometry for one or more fractures activated during the fluid injection phase, the fracture map corresponding to a given time during the hydraulic fracturing operation;
      deriving from the initial fracture map a time series of fracture maps for times preceding the given time; and
      storing the time series on a nonvolatile information storage medium.

12. The system of claim 11, wherein the computer further implements the formation mapping method such that the deriving is performed in an iterative fashion to obtain each fracture map in the time series from a subsequent fracture map.

13. The system of claim 12, wherein the computer further implements the formation mapping method such that the deriving includes:
   estimating fracture dimension changes based at least in part on flow rate measurements during the fluid injection phase;

combining the dimension changes with the subsequent fracture map to get a predicted fracture map;

processing the predicted fracture map with a forward model to get predicted measurements; and comparing the predicted measurements to said deformation measurements to obtain a prediction error.

14. The system of claim 13, wherein the computer further implements the formation mapping method such that the deriving further includes:

inverting said deformation measurements using the predicted fracture map to obtain a refined fracture map when the deformation measurement signal has a signal to noise ratio above a predetermined threshold.

15. The system of claim 13, wherein the computer further implements the formation mapping method such that the estimating accounts for fluid leak-off.

16. The system of claim 12, wherein the computer further implements the formation mapping method such that the time series extends to a beginning of the fluid injection phase.

17. The system of claim 11, wherein the computer further implements the formation mapping method such that the given time corresponds to a termination of the fluid injection phase.

18. The system of claim 11, wherein the data acquisition system further collects the deformation measurements during a closure phase of a hydraulic fracturing operation, and wherein the computer further implements the formation mapping method such that processing the initial fracture map extends the time series of fracture maps for times subsequent to the given time.

19. The system of claim 11, wherein the data acquisition system further collects the deformation measurements from an array of tiltmeters.

20. The system of claim 11, wherein the computer further implements the formation mapping method such that the obtaining includes performing an unguided inversion of the deformation measurements.

* * * * *

UNITED STATES PATENT AND TRADEMARK OFFICE
CERTIFICATE OF CORRECTION

Page 1 of 1

PATENT NO. : 11,150,367 B2
APPLICATION NO. : 15/763204
DATED : October 19, 2021
INVENTOR(S) : Eric J. Davis and Scott D. Marsic It is certified that error appears in the above-identified patent and that said Letters Patent is hereby corrected as shown below:

In the Claims

In Claim 1, Column 10, Line 2, delete:
"medium."
And insert:
--medium; and
using the time series to control or modify the hydraulic fracturing operation or a subsequent hydraulic fracturing operation.--

In Claim 11, Column 10, Line 56, delete:
"medium."
And insert:
--medium and
    using the time series to control or modify the hydraulic fracturing operation or a subsequent hydraulic fracturing operation.--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*